(12) United States Patent
Beauchamp et al.

(10) Patent No.: US 9,211,899 B2
(45) Date of Patent: Dec. 15, 2015

(54) SHOPPING CART WITH FOLDING LEGS

(76) Inventors: Brenda Jo Beauchamp, Ennis, TX (US); Kenneth Roy Hill, Haltom City, TX (US)

(*) Notice: Subject to any disclaimer, the term of this patent is extended or adjusted under 35 U.S.C. 154(b) by 188 days.

(21) Appl. No.: 14/128,912

(22) PCT Filed: Jun. 21, 2012

(86) PCT No.: PCT/US2012/043587
§ 371 (c)(1),
(2), (4) Date: Jun. 27, 2014

(87) PCT Pub. No.: WO2013/191700
PCT Pub. Date: Dec. 27, 2013

(65) Prior Publication Data
US 2014/0369801 A1 Dec. 18, 2014

Related U.S. Application Data

(60) Provisional application No. 61/501,193, filed on Jun. 25, 2011.

(51) Int. Cl.
*B62B 3/02* (2006.01)
*B62B 5/00* (2006.01)

(52) U.S. Cl.
CPC .............. *B62B 3/027* (2013.01); *B62B 5/0003* (2013.01); *B62B 2203/74* (2013.01); *B62B 2206/06* (2013.01)

(58) Field of Classification Search
CPC .. B62B 3/027; B62B 5/0003; B62B 2203/74; B62B 2206/06; B62B 3/02; B62B 3/025; B62B 2206/00; B62B 2203/073; B62B 2203/70; B62B 2203/72; Y10S 280/04
See application file for complete search history.

(56) References Cited

U.S. PATENT DOCUMENTS

| 3,118,553 | A | 1/1964 | Rosenzweig | |
|---|---|---|---|---|
| 5,538,386 | A * | 7/1996 | Scheibel | B66F 9/06 414/347 |
| 5,649,718 | A | 7/1997 | Groglio | |
| 6,024,527 | A | 2/2000 | Soriano | |
| 6,045,150 | A | 4/2000 | Al-Toukhi | |
| 6,070,899 | A | 6/2000 | Gines | |
| 6,176,498 | B1 | 1/2001 | Murphy et al. | |
| 6,193,246 | B1 * | 2/2001 | Ondrasik | B62B 3/148 280/33.995 |
| 6,889,998 | B2 | 5/2005 | Sterns et al. | |

(Continued)

FOREIGN PATENT DOCUMENTS

KR  20-0442301 Y1  10/2008

*Primary Examiner* — John Walters
*Assistant Examiner* — Brian Swenson
(74) *Attorney, Agent, or Firm* — John Lindsay

(57) ABSTRACT

A four-wheel shopping cart includes a substantially rectangular base surrounded by vertical side, front and rear walls to form an open-topped, cargo basket. The front wall opens fully to provide access to the cargo area, while the rear wall is shorter than the others to allow easy access from behind while shopping. A transverse axle mounted below the rear wall supports hinged legs that fold upwards alongside the side walls so the cart can be placed conveniently into a vehicle for transportation. The legs unfold and lock to support the cart on castors for shopping, and may include height adjustment means for lowering the basket to a comfortable level for usage and for raising it to place it into the shopper's vehicle. A pair of small, adjustable wheels mounted on opposite front corners of the base pivot partially to facilitate maneuvering the cart within the vehicle.

10 Claims, 17 Drawing Sheets

(56) References Cited

U.S. PATENT DOCUMENTS

| | | |
|---|---|---|
| 6,932,363 B2 | 8/2005 | D'Angelo |
| 7,080,844 B2 | 7/2006 | Espejo |
| 8,075,016 B2 * | 12/2011 | Silberberg .............. B62B 3/027 |
| | | 280/43 |
| 8,083,253 B1 | 12/2011 | Butler |
| 8,979,115 B1 * | 3/2015 | Baron ..................... B62B 3/027 |
| | | 280/43 |
| 2004/0124598 A1 | 7/2004 | Williams |
| 2008/0093827 A1 | 4/2008 | Silberberg |
| 2010/0320732 A1 | 12/2010 | Dobrachinski |
| 2011/0156375 A1 * | 6/2011 | Gal ......................... B62B 3/027 |
| | | 280/651 |

* cited by examiner

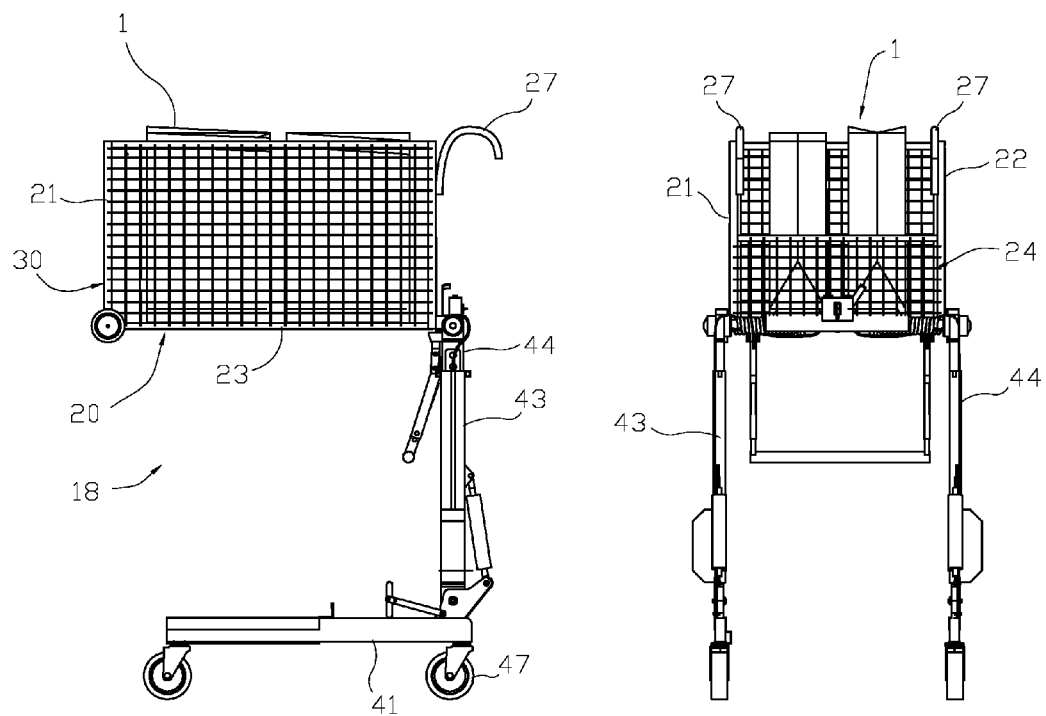
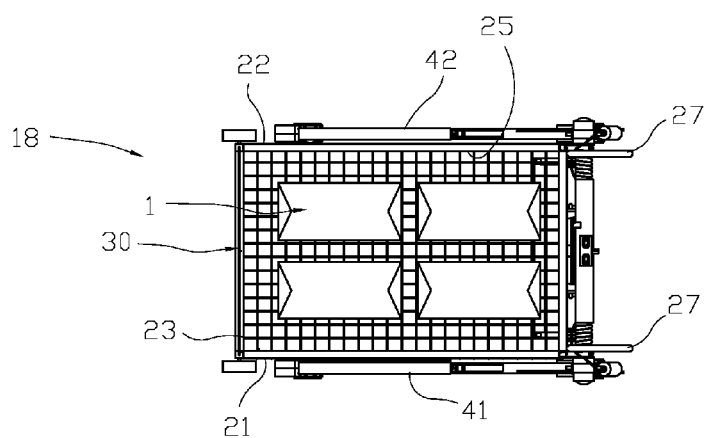

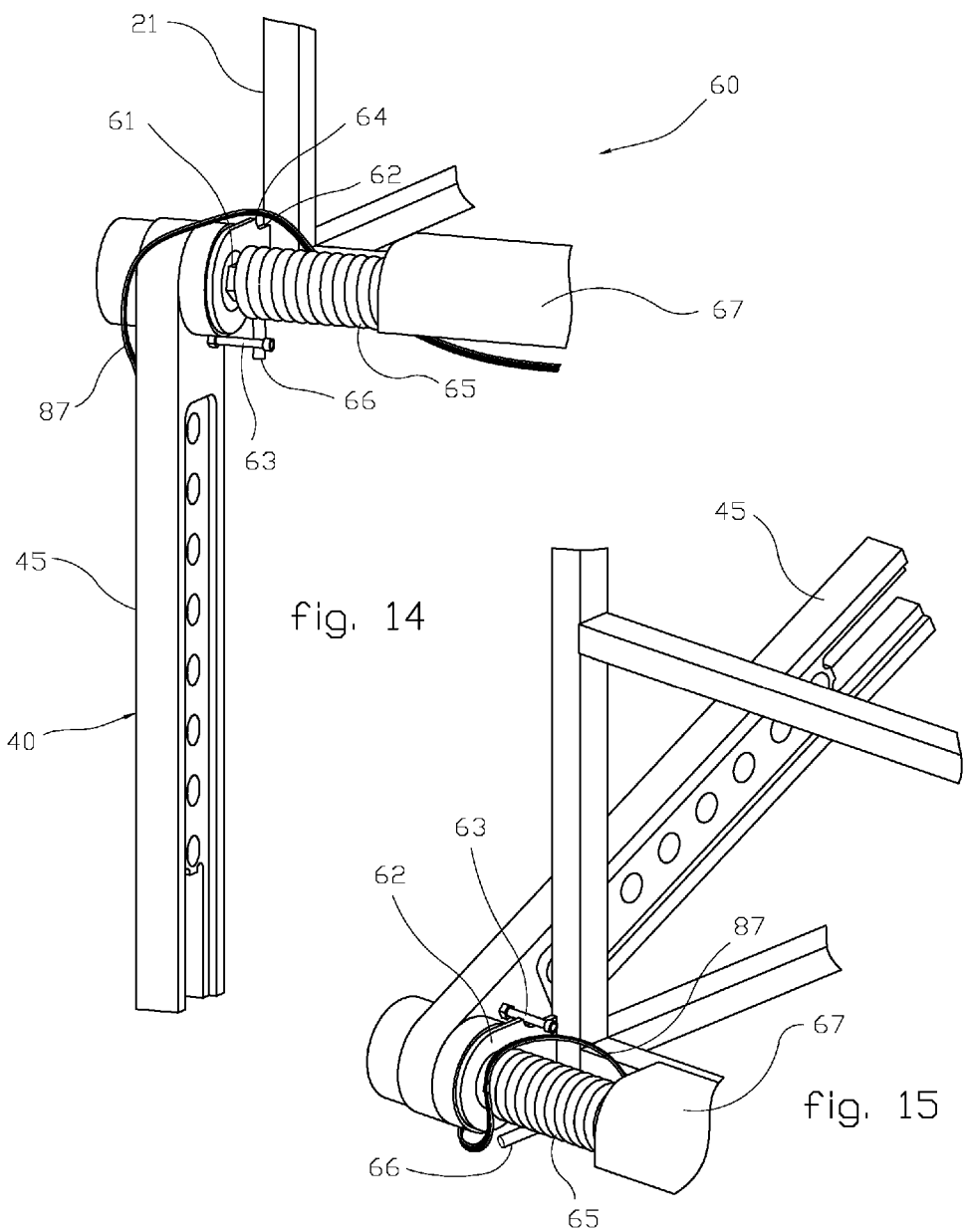

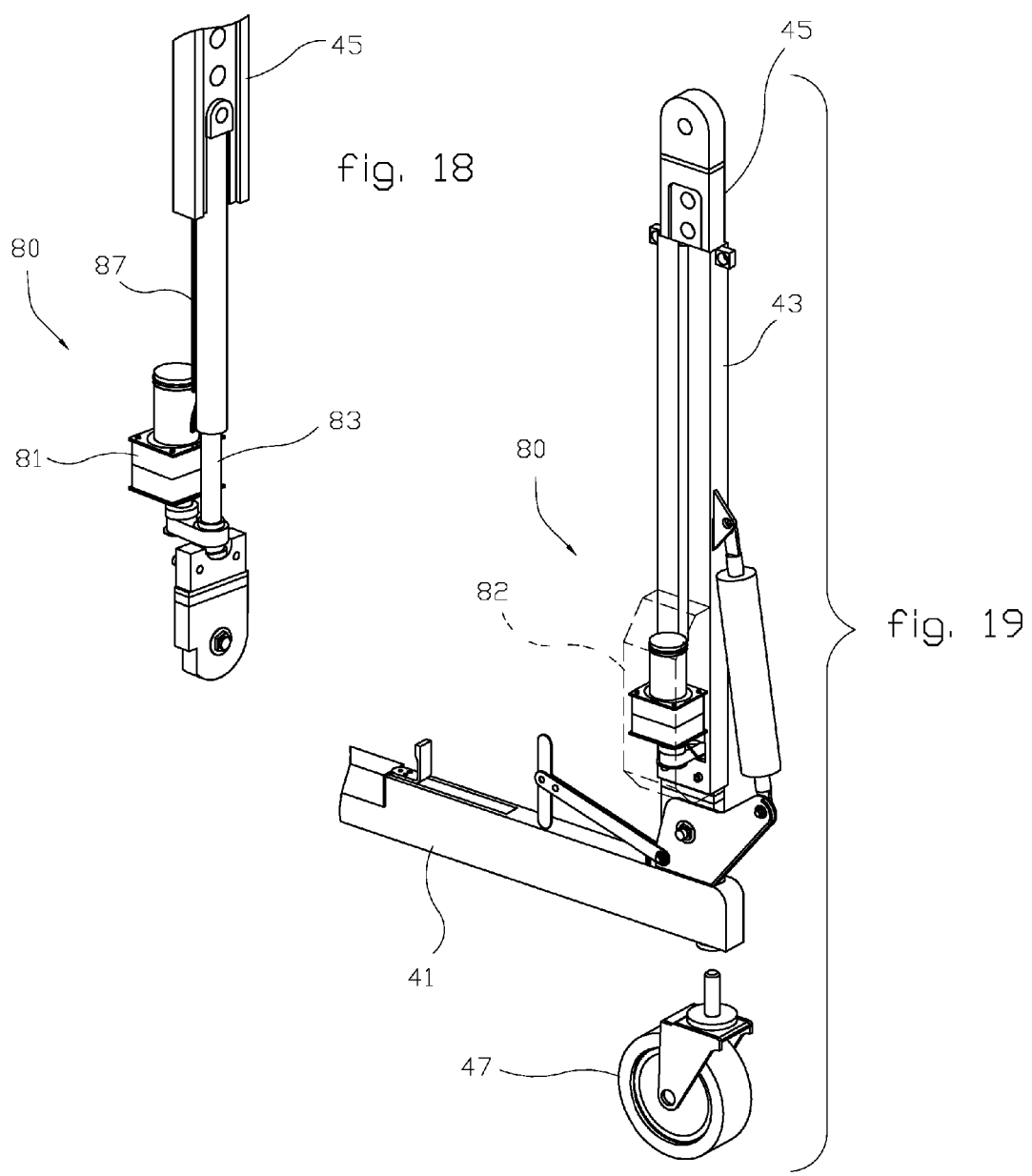

SHOPPING CART WITH FOLDING LEGS

This application claims priority from a Provisional Application Ser. No. 61/501,193, filed Jun. 25, 2011.

BACKGROUND OF THE INVENTION

1. Field of the Invention

This invention relates generally to manually operated, wheeled vehicles, and particularly to four-wheeled, retail store shopping carts such as grocery baskets. More particularly, this invention relates to an adjustable height shopping cart with legs that fold up for transportation in a shopper's vehicle.

2. Description of Related Art

Grocery shopping carts are ubiquitous and quite familiar to most people. They usually comprise a large cargo basket supported at its rear by a cart body that includes a shelf beneath the basket, all supported on castors. The basket is open at the top and may include an infant seat atop the cart body near the shopper. Grocery cart baskets usually are tapered toward the front and include a movable rear wall that collapses inward to permit nesting of one cart into the rear of another, allowing a large number of carts to be stored in a minimum of space pending usage by shoppers.

The typical retail arrangement does not contemplate the shopping carts leaving the premises of the store where they are used for gathering goods. As a result, the shopper must first collect the goods for purchase by placing them into a cart basket, then unload them at a check-out counter where store employees box or sack them up into temporary containers and return them to the cart to be wheeled out to the shopper's vehicle. The shopper then must unload the cart again by placing the containers into a vehicle to be transported home. Yet again, the shopper must move the containers from the vehicle to an area within the shopper's premises where the goods may be used or stored for future use. A need exists for means for reducing the repeated handling of purchased goods between a retailer's shelves and a shopper's storage facilities.

Because of the retailer's motive to nest shopping carts when not in use, all shopping carts are substantially the same height. This one-size-fits-all strategy ignores significant variations in shoppers' statures. A need exists for means for adjusting retail shopping carts to a comfortable level for various individual shoppers of different heights.

Having unloaded their purchases into their vehicles from their shopping carts, shoppers abandon the carts in the retail store parking lot for retrieval by store personnel. Though many shoppers move their emptied carts to staging areas located around the store parking lot, some don't and some retailers don't provide such staging areas, so shoppers simply abandon the carts at random. Anyone whose automobile has received a parking lot nick from an errant, runaway shopping cart knows that this can lead to minor chaos during heavy shopping times when retail personnel don't promptly retrieve the carts. A need exists for an alternative to encouraging shoppers to leave empty shopping carts in retail store parking lots.

Large retail stores that rely on shopping carts must invest significantly in a large supply of such carts and a storage location for them when not in use. Shopping carts also become damaged with use and even stolen from parking lots, and retailers incur significant repair and replacement costs as a result. A need exists for means to relieve retail stores of the investment and maintenance costs of providing a large quantity of shopping carts for shoppers.

SUMMARY OF THE INVENTION

A four-wheel shopping cart includes a substantially rectangular base surrounded by vertical side, front and rear walls to form an open-topped, cargo basket. The front wall opens fully to provide access to the cargo area, while the rear wall is shorter than the others to allow easy access from behind while shopping. A transverse axle mounted below the rear wall supports hinged legs that fold upwards alongside the side walls so the cart can be placed conveniently into a vehicle for transportation. The legs unfold and lock to support the cart on castors for shopping, and may include height adjustment means for lowering the basket to a comfortable level for usage and for raising it to place it into the shopper's vehicle. A pair of small, adjustable wheels mounted on opposite front corners of the base pivot partially to facilitate maneuvering the cart within the vehicle.

BRIEF DESCRIPTION OF THE DRAWINGS

The novel features believed characteristic of the present invention may be set forth in appended claims. The invention itself, however, as well as a preferred mode of use and further objects and advantages thereof, will best be understood by reference to the following detailed description of an illustrative embodiment when read in conjunction with the accompanying drawings, wherein:

FIGS. 2-4 show in left side and rear elevations and top plan views respectively the shopping cart of FIG. 1.

FIGS. 14-15 detail the spring assist mechanism that partially lifts the leg for folding, and keeps the basket at right angles to the leg masts.

FIGS. 16-21 show a motorized adjustment system for raising and lowering the height of the basket relative to the ground.

DESCRIPTION OF A PREFERRED EMBODIMENT

Figure 13:
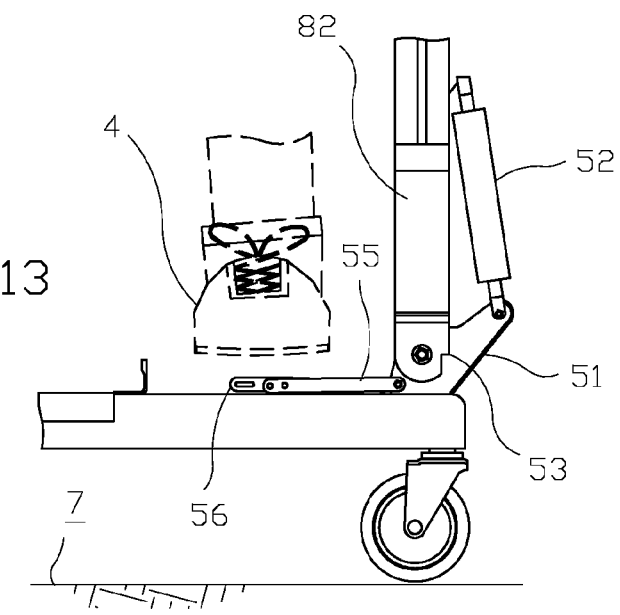
Figure 16:
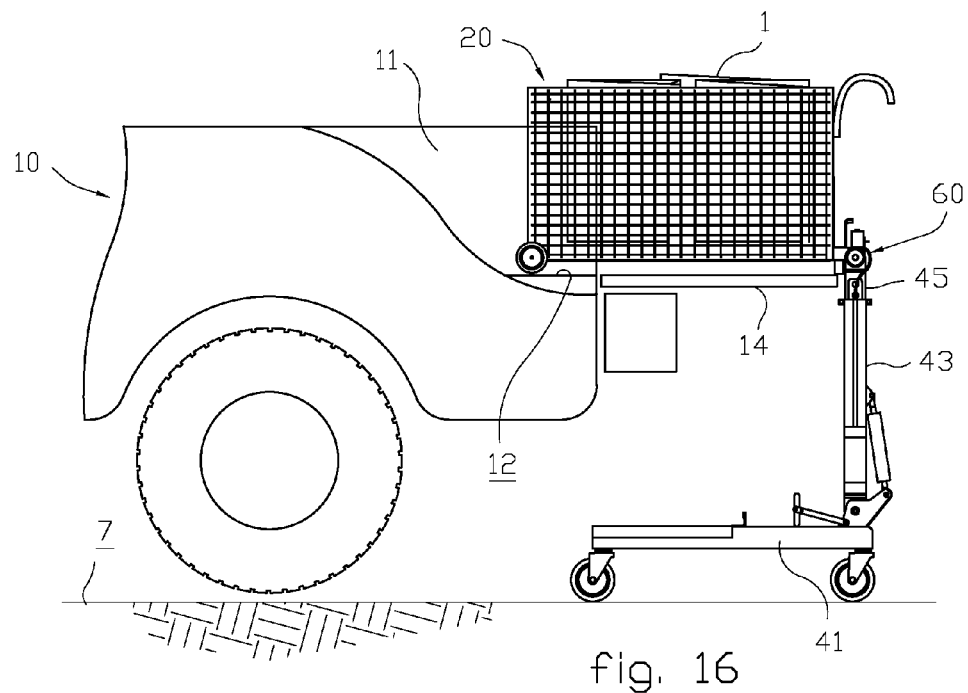
Figure 17:
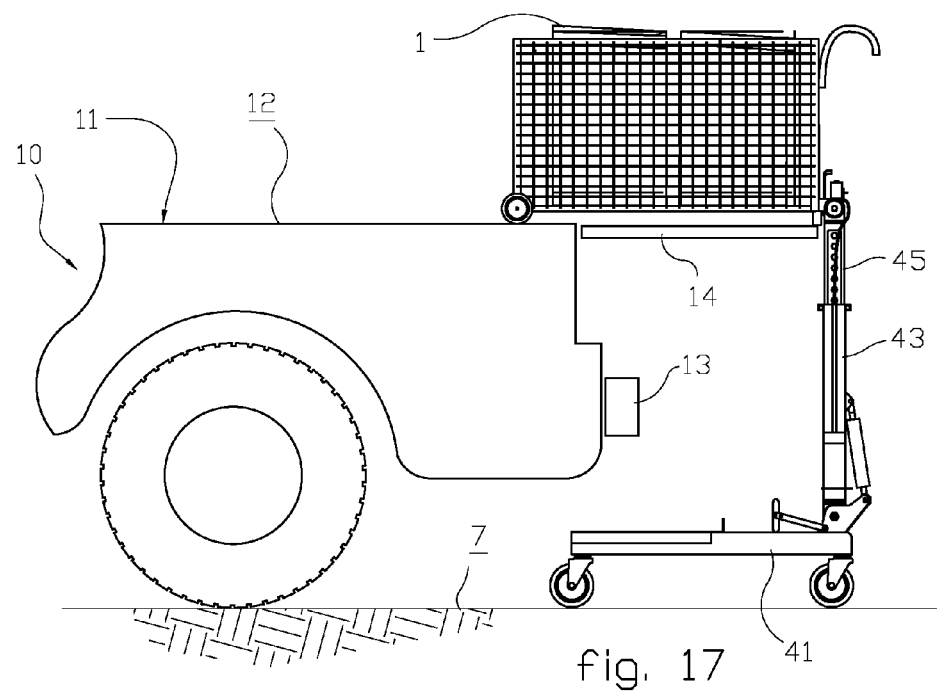
Figure 20:
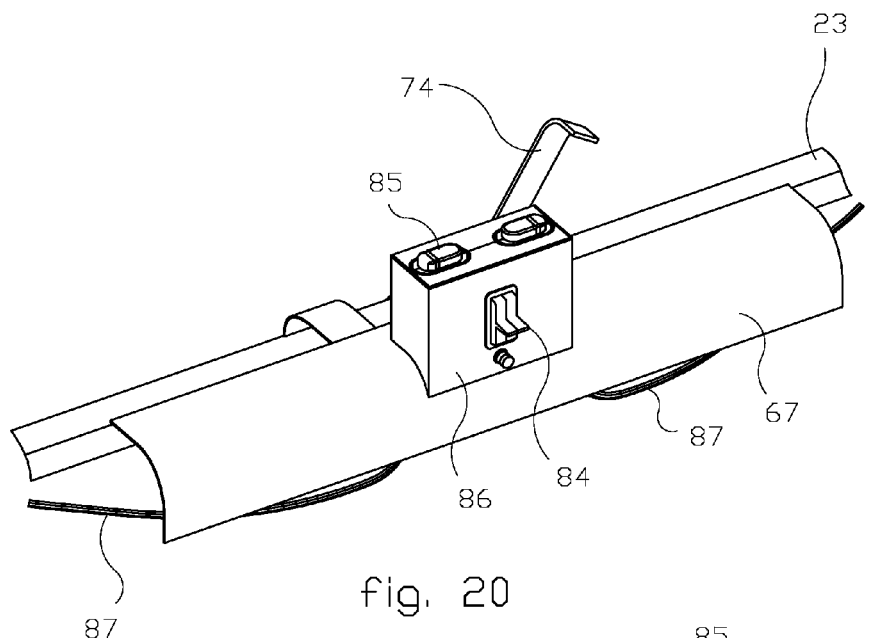
Figure 21:
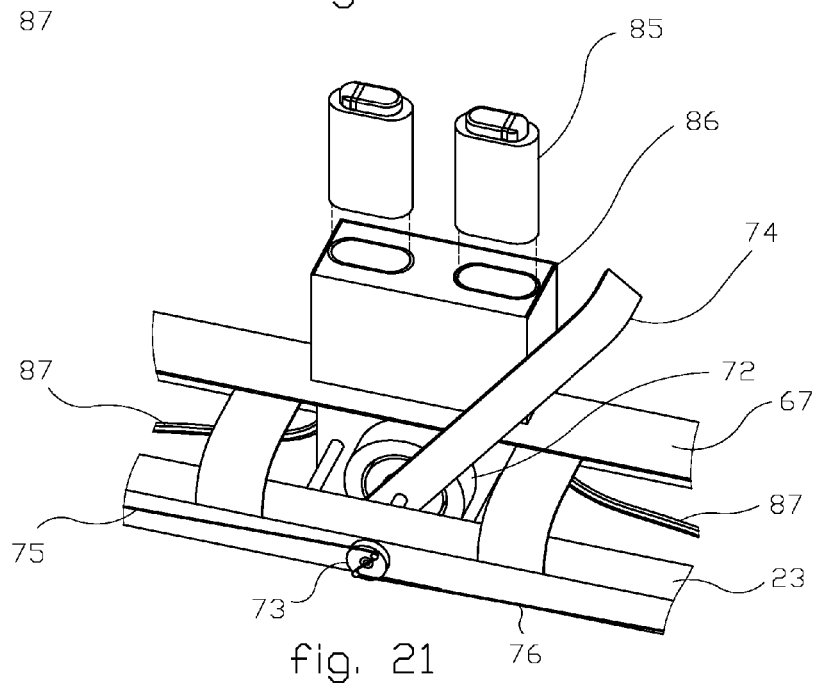
Figure 22:
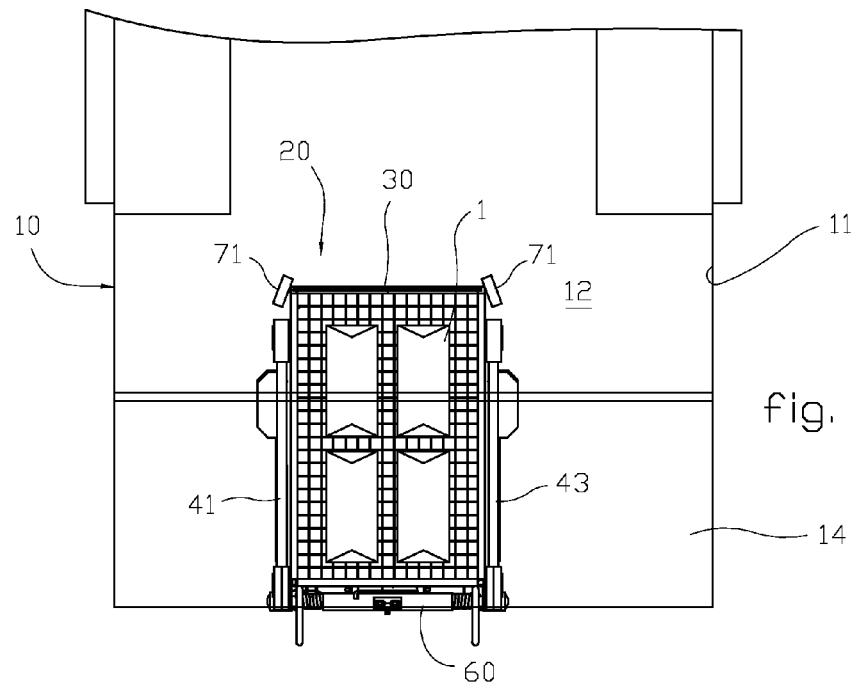
FIGS. 22-26B illustrate and detail use of the front and rear wheels beneath the basket to rotate the folded shopping cart within the cargo area of a vehicle.

Referring first to the figures, and particularly to FIGS. 1-4, the present invention comprises shopping cart 18 adapted for use by shopper 4 (see FIG. 13) in acquiring and transporting cargo 1, presumably from the shelves of a retail store to shopper 4's premises (neither shown). The most common use of such shopping carts is at grocery and department stores, where typically many lengthy, parallel aisles (not shown) lined on both sides with multiple shelves of individually packaged food stuffs and other items that are offered for purchase in individual units (neither shown). Such retailers typically provide store shopping carts (not shown) for shoppers 4 who push the carts along the store aisles as they fill them with goods. Once finished selecting goods, shoppers 4 proceed to a checkout counter (not shown) where the goods are paid for and packaged into temporary containers 1, such as boxes or sacks, provided either by the retailer or by shoppers 4. Temporary containers 1 then typically are loaded back into the shopping carts, whereupon shoppers 4 or store employees (not shown) push the carts out of the store to waiting vehicles 10 (see, e.g., FIGS. 8-11), where containers 1 again are moved from the carts into cargo areas 11 of vehicles 10. The store carts then are discarded, later to be retrieved by store employees for use by other shoppers. Shoppers 4 then drive their respective vehicles 10 home, where containers 1 again are individually handled as shoppers 4 store the goods for subsequent use.

Cart 18 preferably belongs to shopper 4 instead of to the retailer, relieving the latter of cart inventory, storage and maintenance and providing the former with a more consistent, perhaps personalized cart. Once shopper 4 fills cart 18 with goods for purchase, cart 18 carries the goods all the way from the store aisles to shopper 4's storage area, the goods being removed only at the store checkout counter for counting, purchase and collection into temporary containers 1. Cart 18 thus travels with shopper 4 to and from the store in vehicle 10.

To efficiently enable this, cart 18 comes equipped with folding legs 40 that extend to support basket 20 at a convenient height for shopping but which fold alongside basket 20 for transportation in vehicle 10. One having ordinary skill in the art will recognize that the present invention is not limited to the most common retail applications as described above, but may be employed in any of a wide variety of sites where collection of a selection goods from diverse storage sites, such as bins in a warehouse, may be desired, without departing from the spirit and scope of the present invention.

Basket 20 comprises cart 18's cargo space, defined by substantially rectangular base or floor panel 23 surrounded by substantially rectangular, longitudinal side wall panels 21, 22 and transverse rear 24 and front 31 wall panels. As depicted in the figures, panels 21-24, 31 comprise webs of rigid wire mesh surrounded and secured by hollow metal tubing frames, the mesh being small enough to prevent most small objects such as grocery items from falling through. One having ordinary skill in the art will recognize that panels 21-24, 31 could vary from the wire mesh depicted and could be solid sheet metal or plastic, or a mesh made from plastic, as presently are some shopping carts, without departing from the spirit and scope of the present invention. Handles 27 mounted on either side of the rear of basket 20 assist in maneuvering cart 18, and fold inwards (not shown) toward rear panel 24 for storage and transportation.

Unlike with typical retailer-supplied shopping carts, which usually taper both front-to-back and top-to-bottom (not shown) to form a pyramidal cargo area adapted for cart nesting, panels 21-24 preferably are rectangular and form a regular boxed cargo area 25. This box-shaped cargo space 25 substantially increases the carrying capacity of basket 20 over conventional carts while using substantially the same retail store aisle space. Since there is no need to nest cart 18, it thus can carry substantially more cargo 1 than the typical shopping cart.

Figure 5:
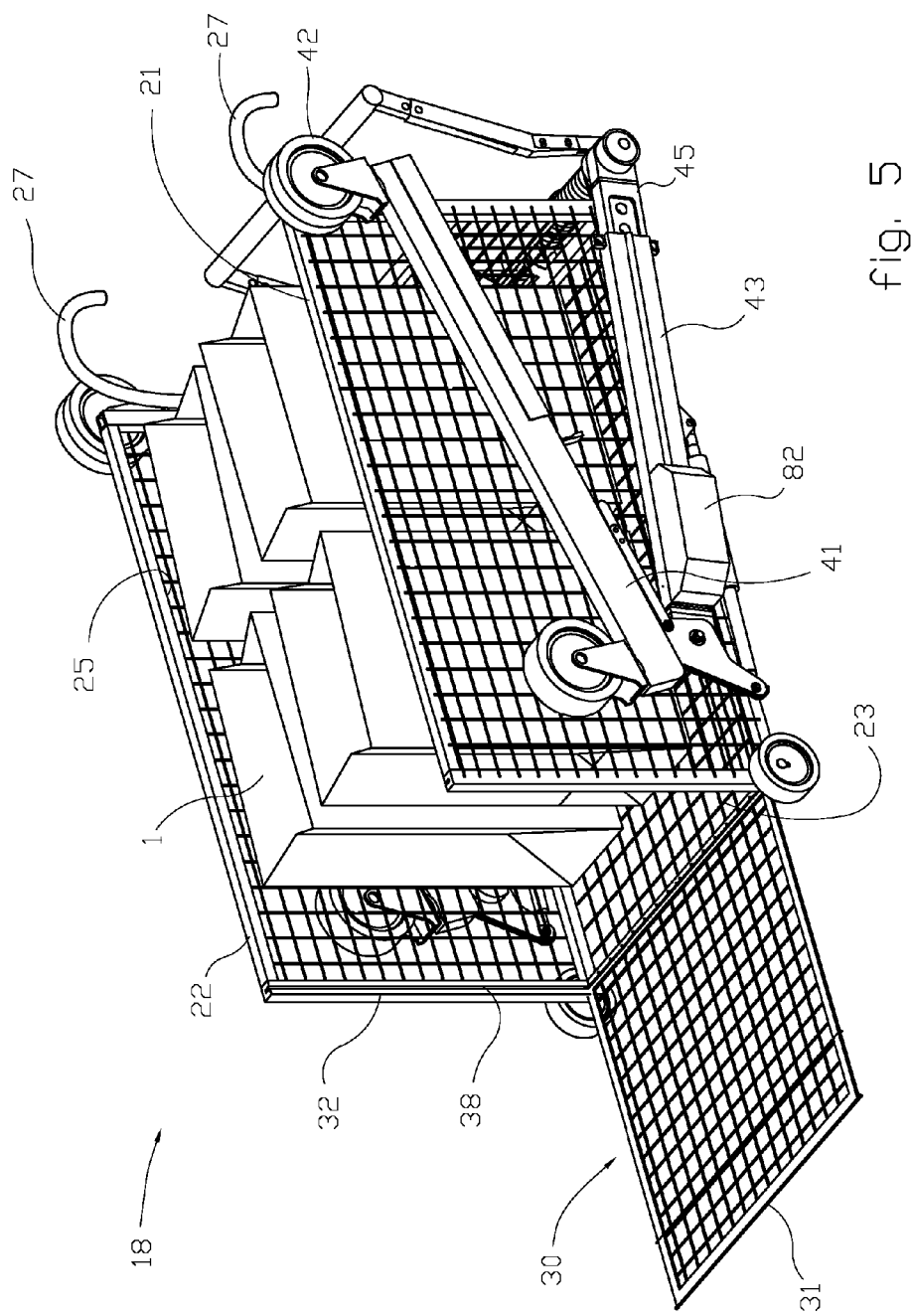
FIG. 5 shows in front quartering perspective the shopping cart of FIG. 1 with its legs folded and the front panel opened to access the cargo area.
Figure 6:
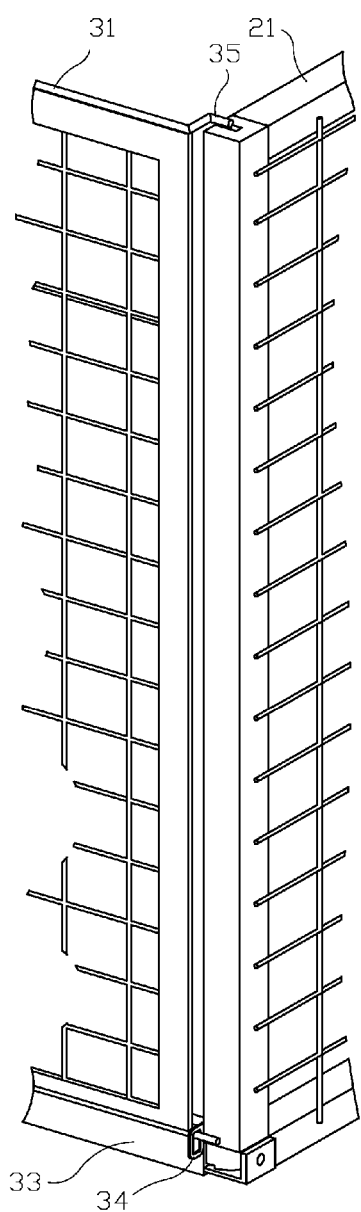
FIGS. 6-7B detail the closing mechanism of the front panel shown in FIG. 5.
Figure 7A:
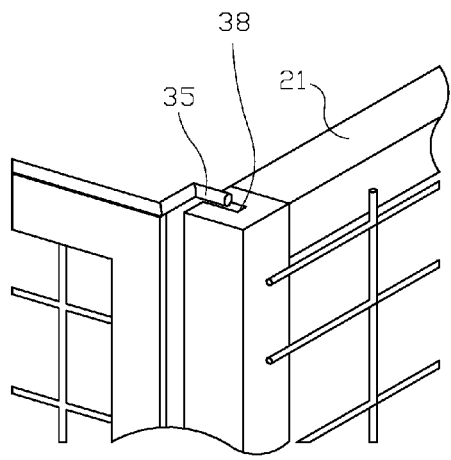
Figure 7B:
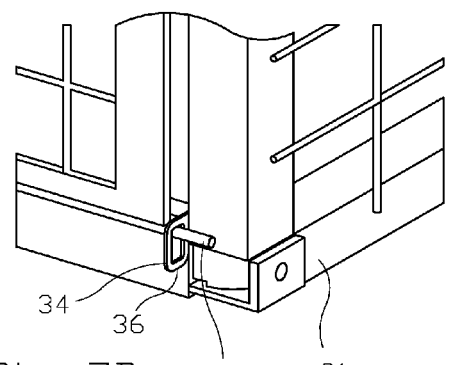

Turning now also to FIGS. 5A-7B, cart 18 includes front door 30 adapted to open and to allow convenient access to cargo area 25. As shown, front door 30 comprises panel 31 hinged at its bottom to swing downward into a position out of the way below floor 23. Panel 31 includes transverse rod 33 extending beyond its bottom width on both sides to engage vertical slots 36 in escutcheons 34 extending from side panels 21 on either side of front door 30. Panel 31 articulates vertically between raised and lowered positions, the length of travel thereof defined by slot 36. At the top of panel 31, upper peg 35 mates with groove 38 in side panel 21 to lock panel 31 in place when it is lowered, but permitting peg 35 to clear the top of panel 21 when panel 31 is raised, Panel 31 pivots on rod 33 within slot 36 of escutcheon 34 and lays flat as shown in FIG. 5 or dangles below base 23 (not shown) as desired. One having ordinary skill in the art will recognize that door 30 could open and close using other means, such as hinging similarly at the top of basket 20, or on side hinges (neither shown) without departing from the spirit and scope of the present invention.

Figure 8:
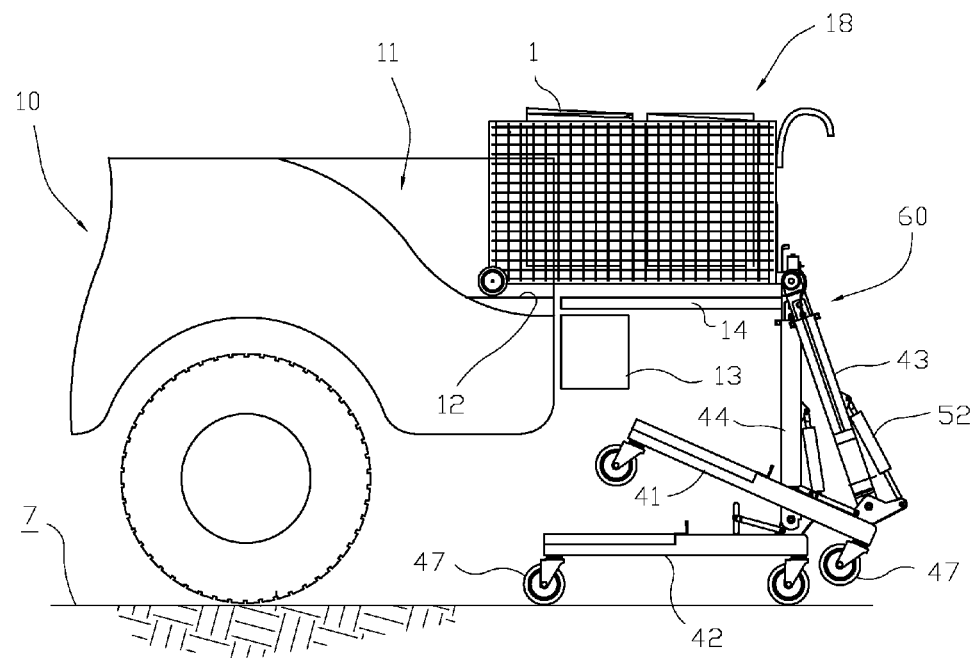
FIGS. 8-9 show the shopping cart of FIG. 1 being loaded into a pickup truck, and detail its left leg assembly being folded.
Figure 9:
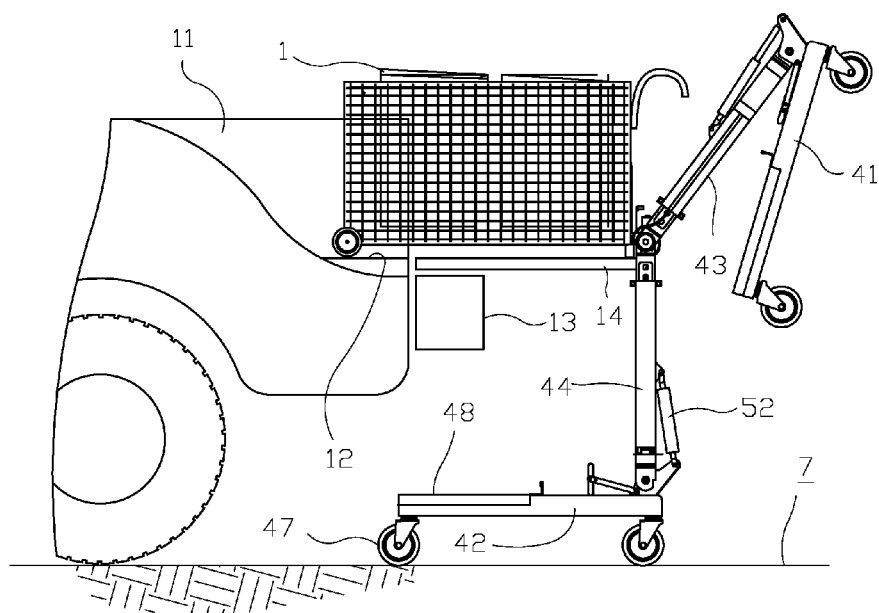
Figure 10:
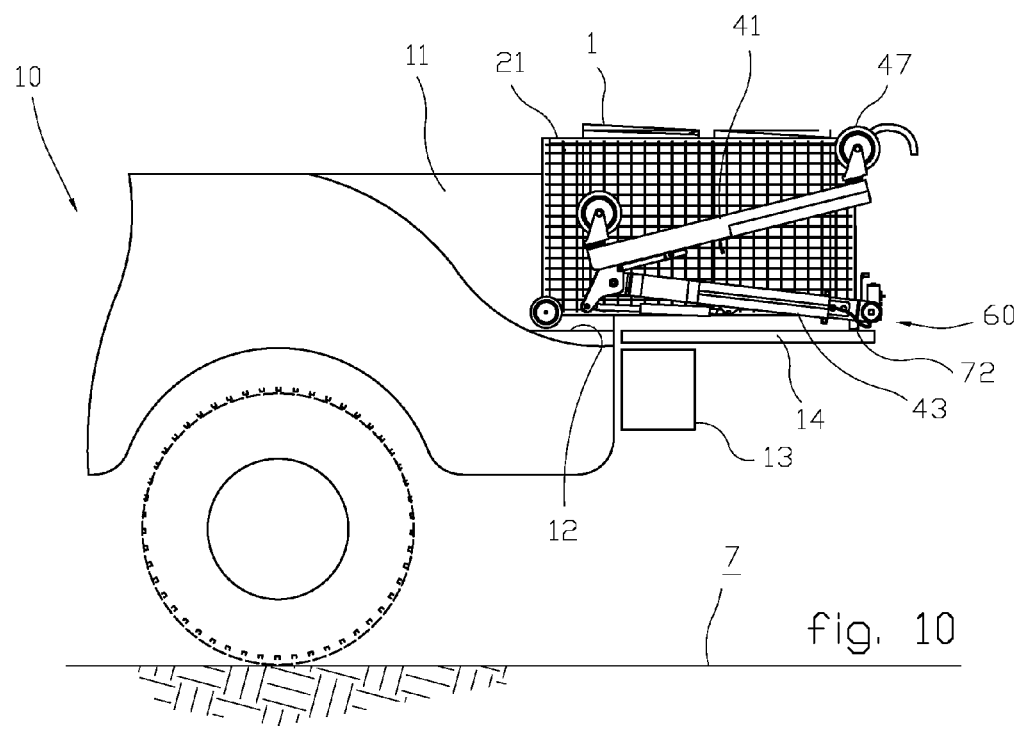
FIGS. 10-11 depict the shopping cart of the present invention resting on the pickup truck's tailgate with both its legs folded for transportation.
Figure 11:
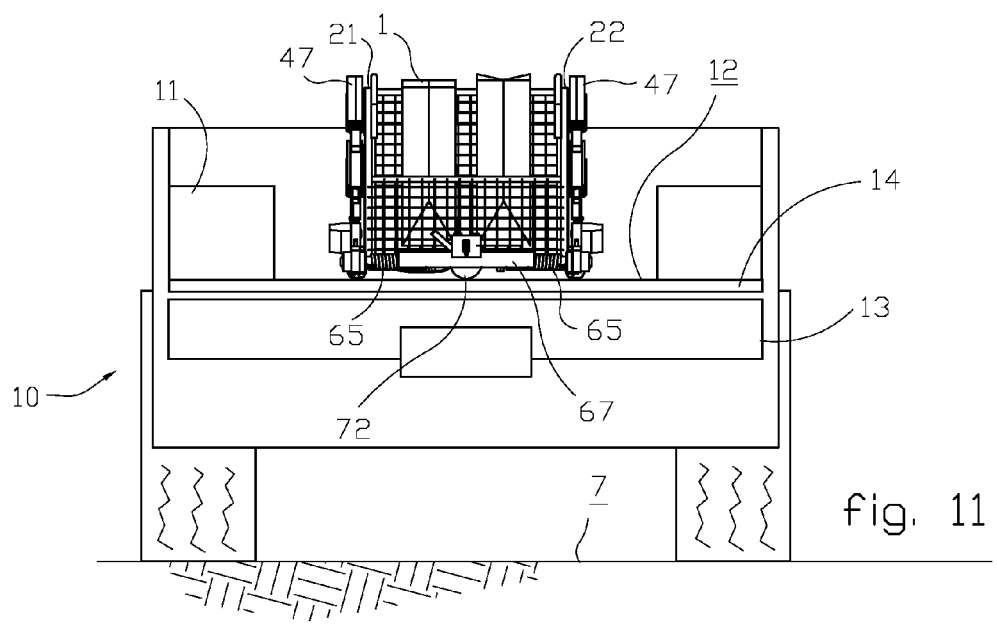
Figure 12:
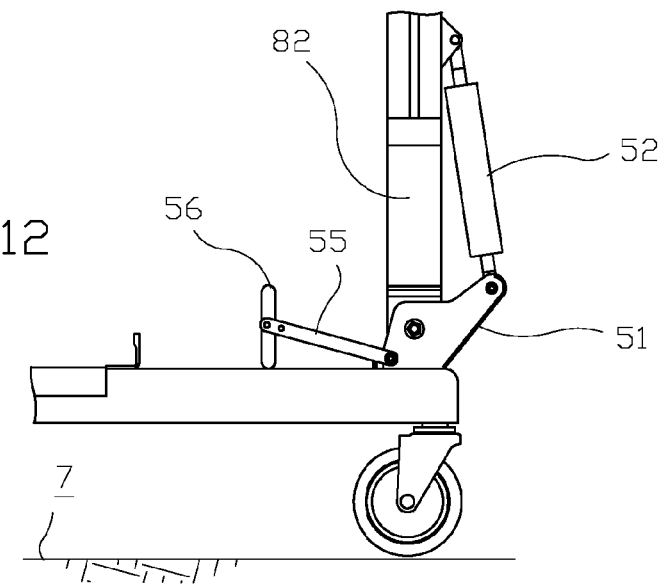
FIGS. 12-13 detail a latch mechanism that holds each leg assembly in its extended, load-bearing position.

Turning now also to FIGS. 8-15, folding legs 40 comprise masts 43, 44 coupled to opposite rear, bottom corners of basket 20 (as discussed in detail below) and extending vertically downward (in their unfolded position) to horizontal footers 41, 42, each of which rests on rolling surface 7 (such as the ground, a driveway or parking lot, or a building floor) upon a pair of castors 47. No lower shelf is shown atop footers 41, 42, as with conventional shopping carts, because legs 40 move individually, as illustrated in FIGS. 8, 9. One having ordinary skill in the art will recognize, however, that a removable shelf (not shown) could span between footers 41, 42 for use during shopping, the shelf being removed and set aside or clipped to basket 20, for example to rear panel 24 (not shown). Foot pad 48 may be provided atop footers 41, 42 for operator 4's foot to engage when lowering and raising legs 40, as discussed below.

Figure 27:
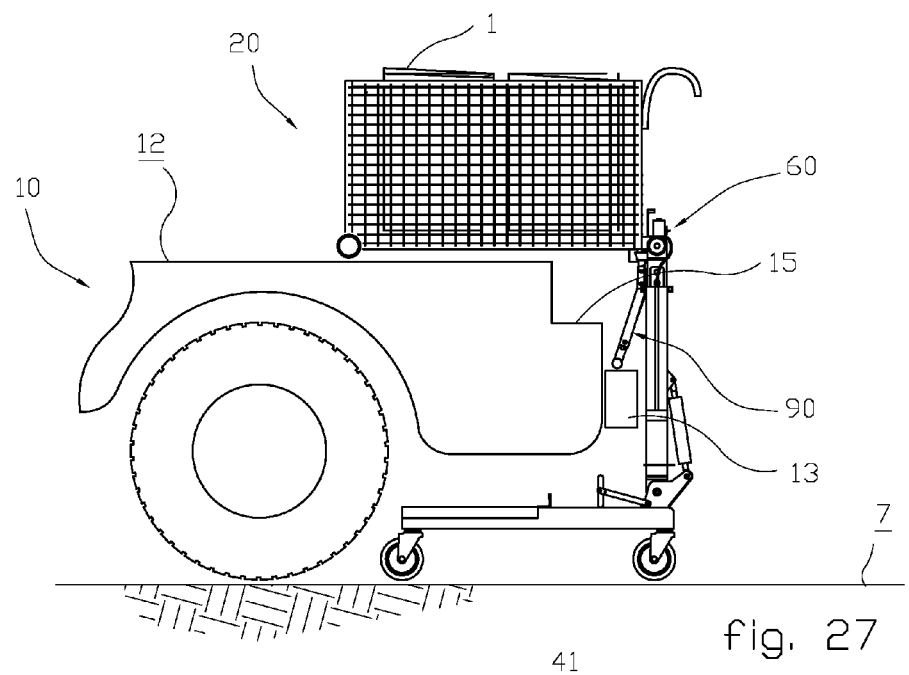
FIGS. 27-32 detail a prop for the rear of the cart of FIG. 1, the prop serving to assist in loading and unloading the cart from a vehicle that has a rear or side door recess.
Figure 28:
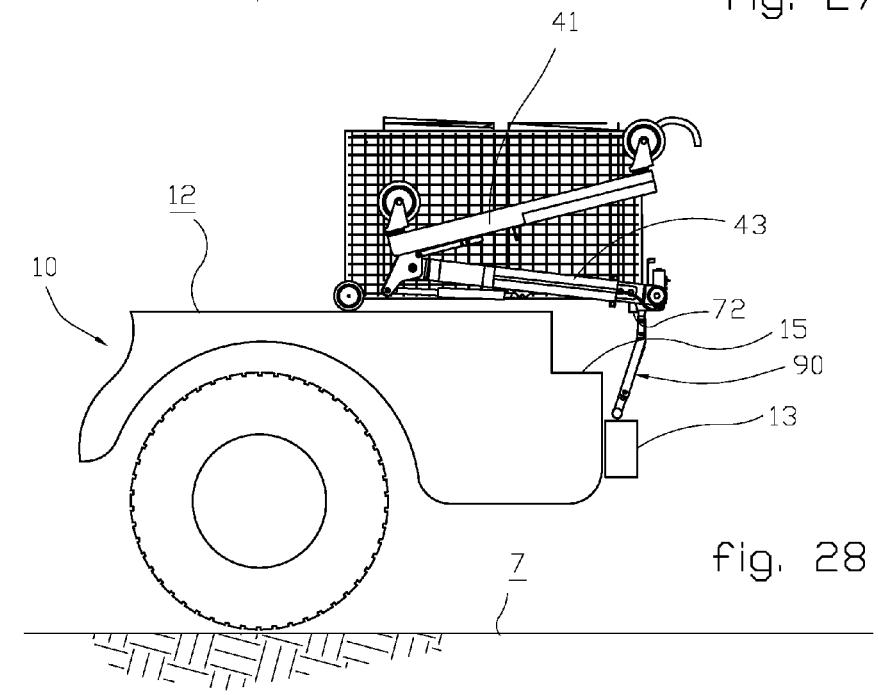
Figure 29:
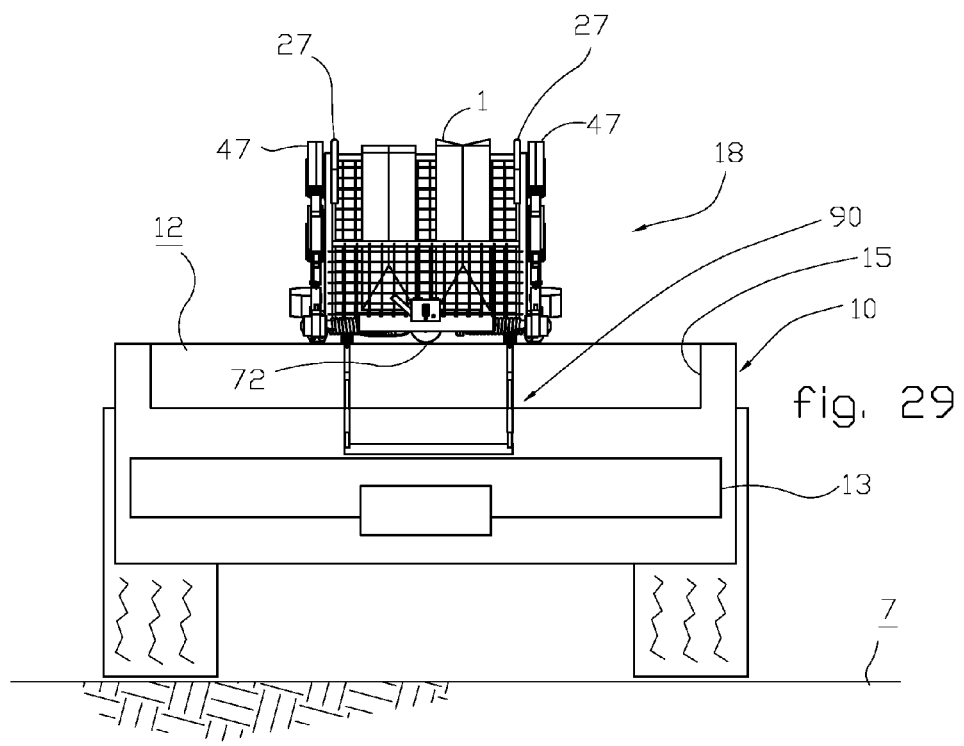
Figure 30:
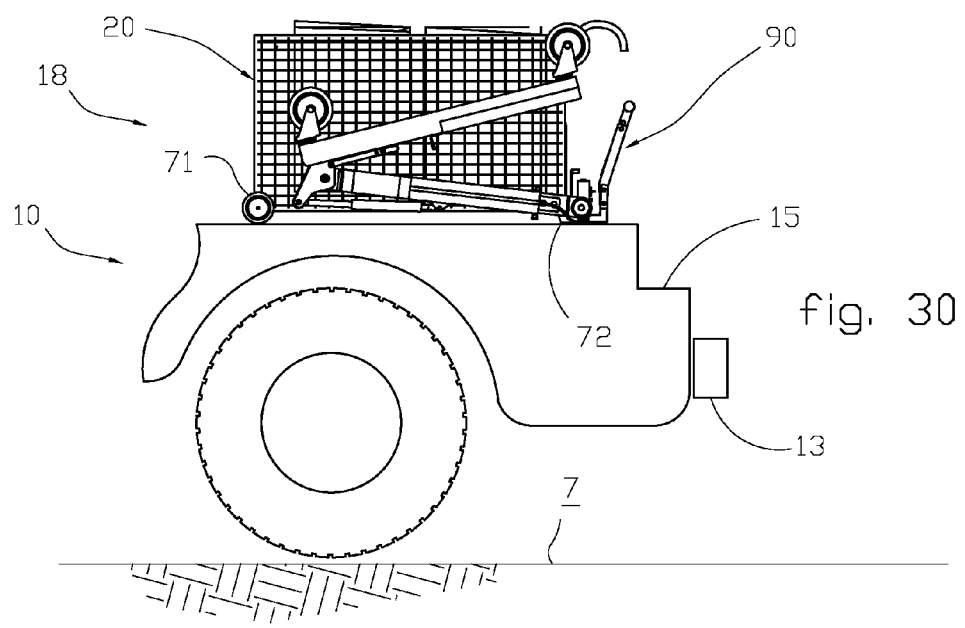

Also deviating from the typical shopping cart, cart 18's legs are substantially vertical instead of slanting downward beneath basket 20. Such geometry stabilizes common shopping carts by shifting their center of gravity rearward, but it is not necessary for the present invention. As seen in FIGS. 8, 9, cart 18 may be wheeled up to vehicle 10 as close as permitted by the edges of obstacles on vehicle 10 such as tailgate 14 or bumper 13 (see FIG. 27). This enables shopper 4 to position substantially all of basket 20 atop tailgate 14 and cargo floor 12 of vehicle 10, thus bringing cart 18's center of gravity well within vehicle 10 while its legs 40 still support cart 18 on rolling surface 7. Thus, when legs 40 are raised, as described below, cart 18 already is supported by vehicle 20. One having ordinary skill in the art will recognize that other shapes for legs 40, such as rearwardly curved (not shown), with concomitant changes to masts 43, 44, could accomplish the same result without departing from the spirit and scope of the present invention.

FIGS. 8-11 may be viewed as a sequence of steps in folding and unfolding legs 40. In a folding operation, shopper 4 first pulls cart 18 up to tailgate 14 until masts 43, 44 touch its rear edge (FIGS. 8, 9). Addressing the left one of legs 40 first, shopper 4 uses his foot to release latch 55 by pivoting keeper 56 to permit latch lever 55 to rotate downward to a position lying atop footer 41. This unlocks footer 41 from mast 43, effectively permitting mast 43 to fall forward toward footer 41 under the weight of basket 20. As basket 20 is supported on tailgate 14, however, the effect is that mast 43 instead rotates rearward, lifting footer 41 with it. As this release may be abrupt and further urged by coil spring 65, as discussed below, damper 52 slows the rise of mast 43, allowing shopper 4 easily to grasp and lift leg 40 (FIG. 9) and rotate it into position alongside side panel 21 (FIGS. 10, 11) where it rests during transportation in vehicle 10. Shopper 4 then repeats this operation for the right one of legs 40, resulting in the configuration shown in FIGS. 10, 11 with cart 18 resting entirely on vehicle 10.

Legs 40 mount on opposite ends of transverse leg axle 61 mounted by gussets 62 to the rear of base 23 at the bottom of rear panel 24. As best seen in FIGS. 14, 15, coil springs 65 surround leg axle 61 and include finger 66 on their ends adjacent leg 40 which bears against limit arm 63 affixed to the inside of leg 40. As leg 40 rotates into its folded position, finger 66 ceases to bear against limit arm 63, requiring shopper 4 to lift leg 40 through the remainder of its rotation into its folded position. When leg 40 reaches such folded position, limit arm 63 engages detent 64 of gusset 62, stopping leg 40's rotation and serving to affix leg 40 in its folded position.

Figure 1:
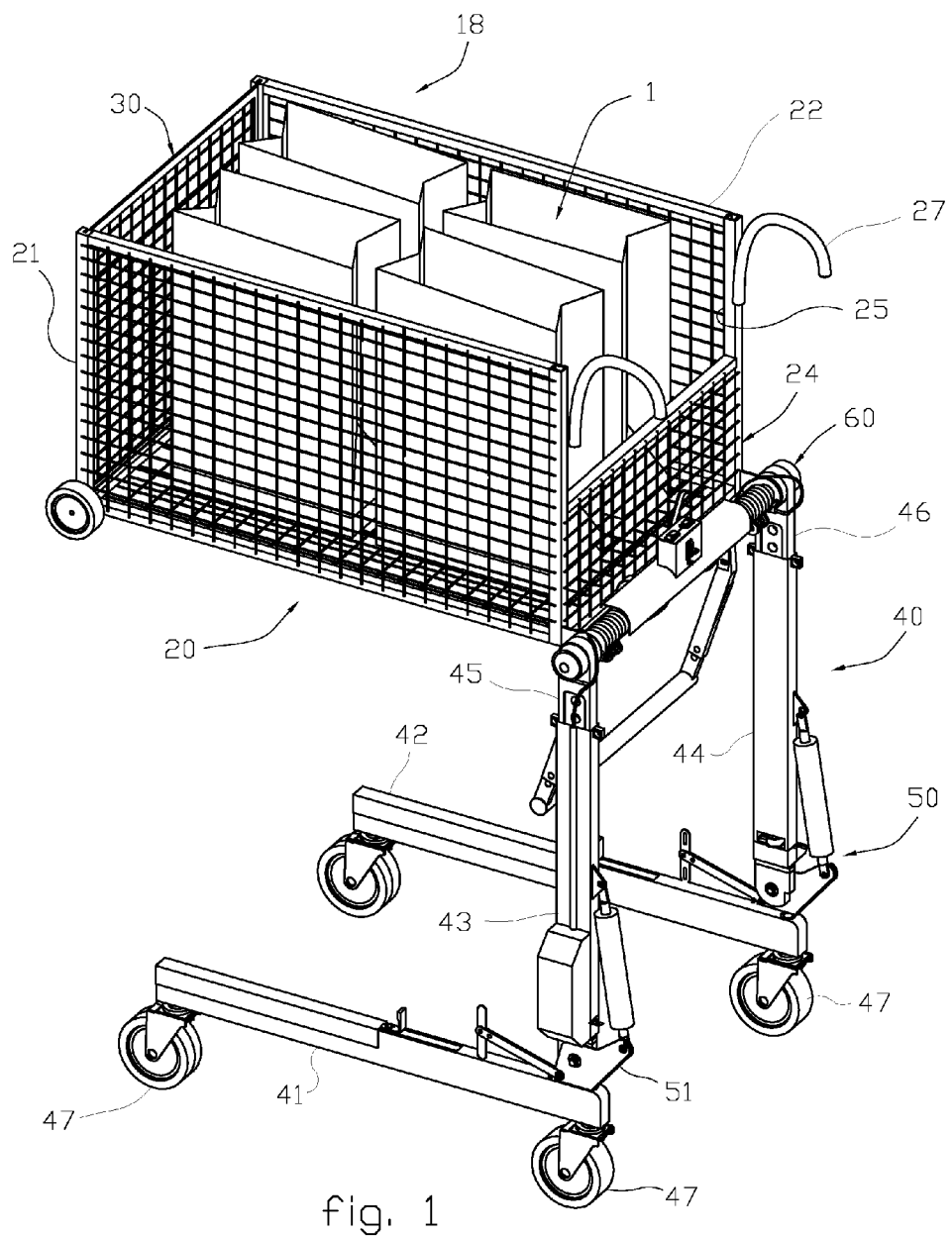
FIG. 1 shows in rear quartering perspective the shopping cart of the present invention.

To unfold legs 40, shopper 4 reverses the steps described above. Unfolding one leg 40 at a time, shopper 4 lifts mast 43 to disengage limit arm 63 from detent 64 and rotates leg 40 rearward until limit arm 63 engages spring end 66. At this juncture, leg 40 is positioned substantially as depicted in FIG. 8. Shopper 4 then places his foot atop footer 41, perhaps on footrest 48 and presses downward, thereby rotating coil spring 65 and straightening footer 41 into a position at right angles to mast 43, castors 47 engaging ground 7. Latch 55 locks footer 41 into this position. Shopper 4 then rotates keeper 56 into the position shown in FIG. 12 wherein it prevents latch lever 55 from moving downward, accidentally unlatching leg 40 and causing leg 40 to collapse under the weight of basket 20. At this juncture, leg 40 is positioned substantially as depicted in FIGS. 1-3. Once shopper 4 repeats these steps for the other leg 40, cart 18 again is ready to roll on castors 40 for transporting or collecting cargo 1.

Turning next to FIGS. 16-21, means for adjusting the height of basket 20 above the floor or ground 7 comprises leg extensions 45 that telescope into leg masts 43, 44 and couple masts 43, 44 to axle 61. Thus, when extension 45 articulates between lowered (FIG. 16) and raised (FIG. 17) positions, basket 20 moves with it to lowered and raised elevations respectively. This feature is useful not only to adjust the height of basket 20 for the convenience of shoppers 4 of different statures, but also for lifting basket 20 to the level of floor 12 within cargo space 11 of vehicle 10.

Preferably, means for extending leg 40 comprises motor system 80. Electric motor 81 drives worm gear 83 coupled to leg extension 45 to telescopically extend it vertically out of, and extract it into, masts 43, 44. Motor 81 mounts to the lower portion of masts 43, 44 and is covered with housing 82 for safety and aesthetics. One having ordinary skill in the art will recognize that other means of adjusting the height of legs 40, such as spring pins and holes in legs 40 (not shown), may be substituted for motor system 80 without departing from the spirit and scope of the present invention, and that all such height adjustment means are considered to be within the spirit and scope of the present invention.

Motor 81 is powered by batteries 85 disposed at the rear of basket 20 above axle 61, and connected thereto by electric leads 87. Two-way reversing switch 84 reverses polarity on leads 87 to drive motor 81 in opposite directions to lower and raise extension 45 as desired. Preferably, batteries 85 comprise high capacity, twelve volt, deep cycle rechargeable batteries with long utility cycles, available commercially. Motor 81 preferably comprises a twelve volt DC, 5-10 watt, reversible, high torque, 12-15 pound robot weight class electric gear motor. A suitable motor is Model No. HG-62 available from Robot Marketplace Company of Bradenton, Fla. USA.

Turning next also to FIGS. 22-26B, maneuvering means for assisting shopper 4 in maneuvering cart 18 within vehicle 10 comprises front and rear maneuvering wheels 71, 72 on which basket 20 rests when not supported by legs 40. Transverse rear maneuvering wheel 72 is mounted with its axle aligned with side panels 21, 22 whereby it rotates when the rear of basket 20 is urged laterally. Front maneuvering wheels 17 normally are positioned conventionally, mounted on transverse axles disposed at the front left and right corners of base 23 and rotate when cart 18 is urged longitudinally. Shopper 4 wishing to push cart 18 directly into vehicle 10 atop floor 12 simply lifts basket 20 with handles 27 to take the weight of cart 18 off of rear wheel 72 and pushes cart 18 into cargo area 11.

Figure 23:
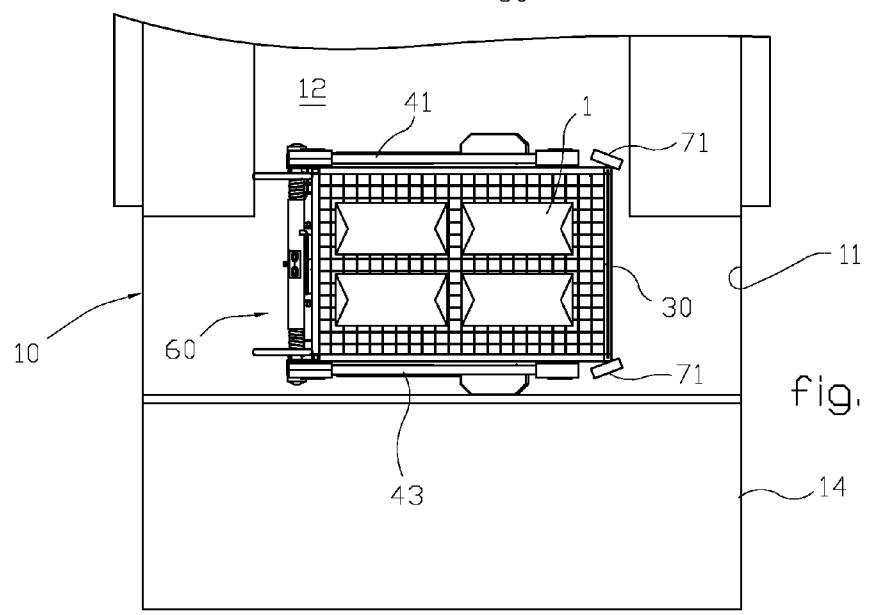

Some vehicles 10, however, may not have cargo areas 11 deep enough to receive cart 18 lengthwise but could accommodate it if it were positioned sideways, as depicted in FIG. 23. This is why rear wheel 72 comprises a single point of support for basket 20 and rotates without resistance when the rear of cart 18 is urged laterally, a motion that would achieve the positioning shown in FIG. 23 from that shown in FIG. 22. To further assist this movement to reposition cart 18 sideways, front wheels 71 are movable, mounted on bracket 77 instead of directly to side panels 21, 22 or base 23. Bracket 77 rotates about pivot 78 which extends into the bottom of base 23, permitting front wheels 71 to toe in as shown in FIGS. 22-24, 26B. When toed-in as shown, front wheels 71 also rotate as the rear of cart 18 is urged sideways, significantly increasing the maneuverability of cart 18 within cargo area 11.

Figure 24:
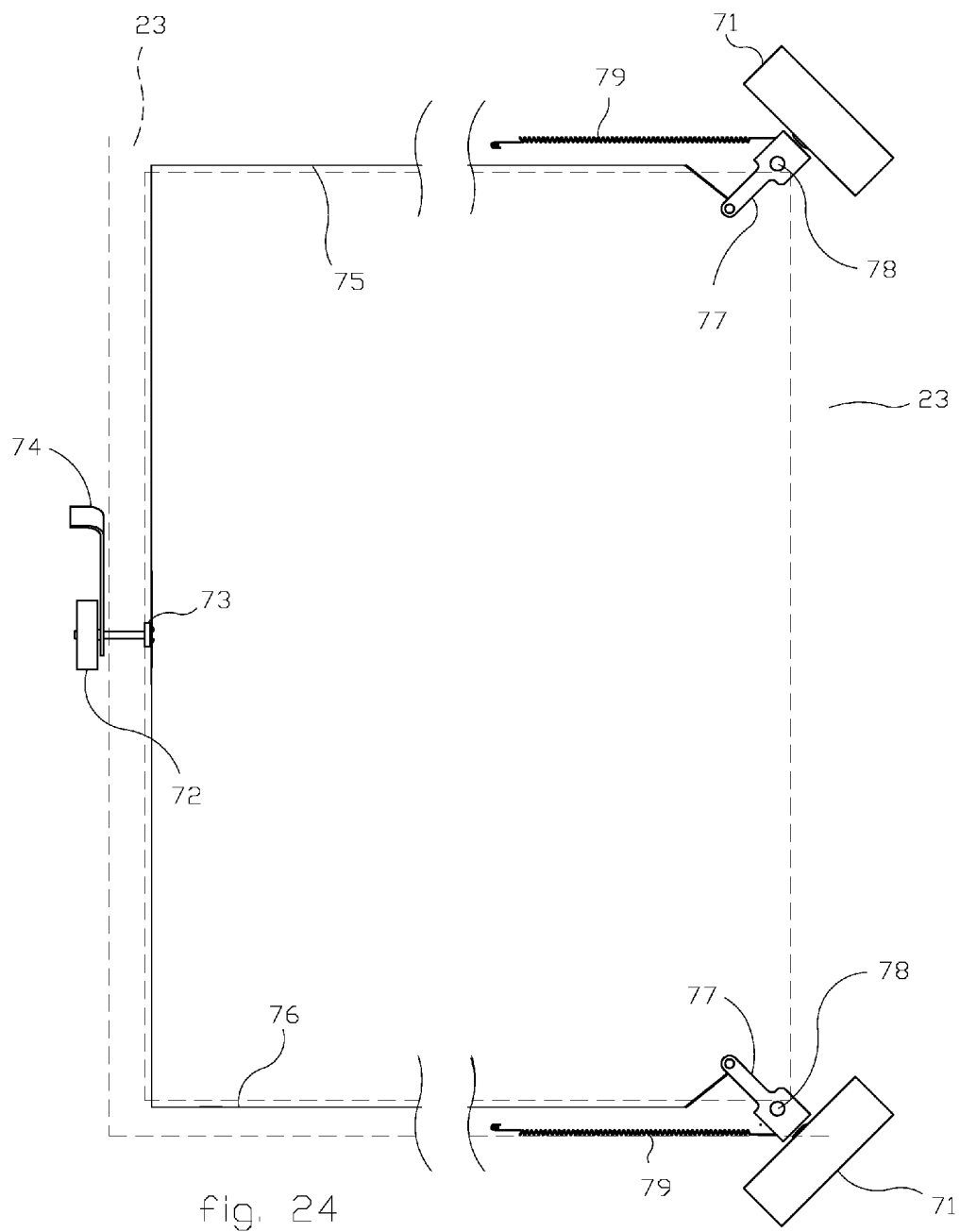
Figure 26A:
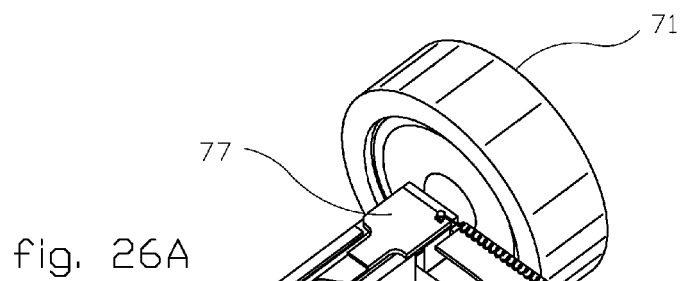
Figure 25:
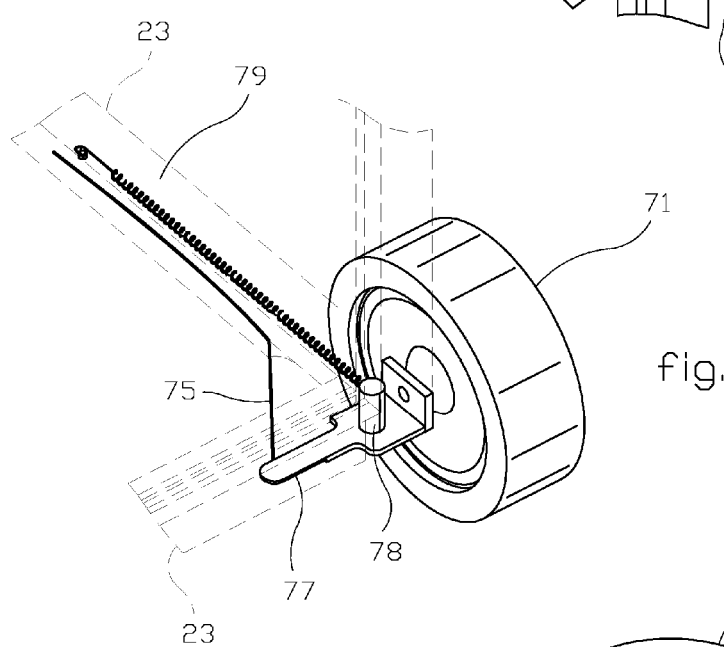
Figure 26B:
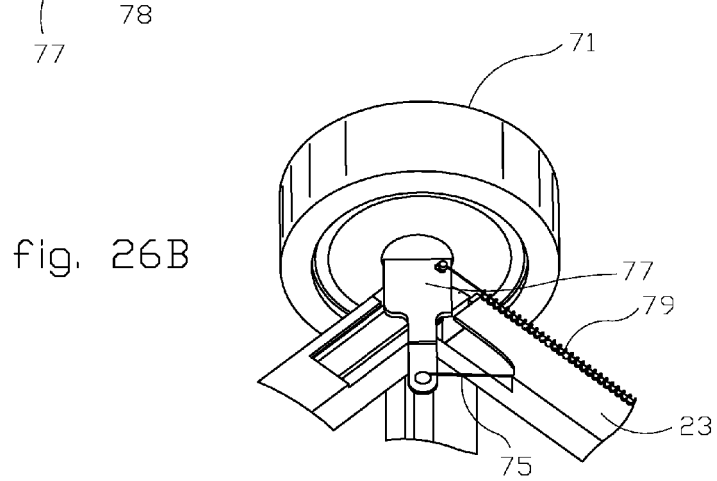

To effect this toe-in of front wheels 71, shopper 4 rotates lever 74 (see also FIGS. 20, 21) which turns pulley 73 mounted at the rear of base 23 below shroud 67. Lever 74 couples to pulley 73 and articulates between toed-in, maneuvering positions and normal, stand-by positions for front wheels 71. Coupled to the end of bracket 77 opposite wheels 71, cables 75, 76 extend through the frame tubes of base 23 to couple to pulley 73. Thus, when lever 74 turns pulley 73 it shortens cables 75, 76, pulls bracket 77 out of alignment with the side tube of base 23 and thus toes-in front wheels 71 into their maneuvering position as shown in FIGS. 24, 26B. When lever 74 is returned to its alternate position by shopper 4, pulley 73 relaxes and effectively lengthens cables 75, 76, thereby permitting return spring 79 to straighten bracket 77 and return front wheels 71 back into their standby positions in longitudinal alignment with cart 18, as shown in FIGS. 25, 26A.

Turning next to FIGS. 27-32, optional prop 90 supports the rear of basket 20 when bumper 13 interferes with legs 40 and prevents inserting basket 20 far enough into cargo area 11 to rest rear wheel 72 on floor 12 while legs 40 are folded or unfolded. Such a situation can be common when vehicle 10 is a sport utility vehicle (SUV) which has doors that mate with recesses 15 in floor 12. Without prop 90, base 23 of basket 20 comes to rest somewhere along its longitudinal length forward of wheel 72. This could be unstable, especially if cargo 1 is unevenly distributed within basket 20 and weighted toward the rear, and could cause cart 18 to tip backwards, pivoting on its contact point at the edge of floor 12 at recess 15. Instead, prop 90 rests atop bumper 13 or even in recess 15 (not shown) to hold basket 20 substantially horizontal while rear wheel 72 is suspended in midair.

Figure 31:
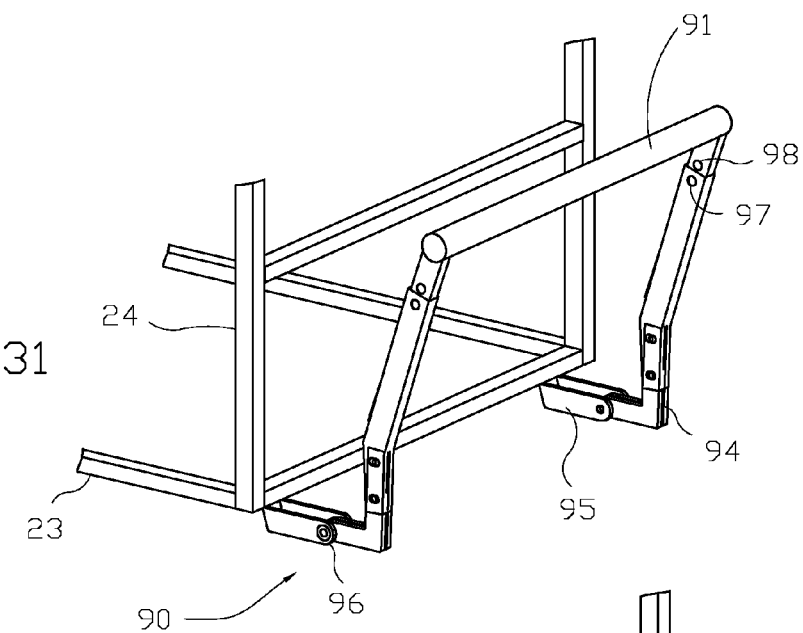
Figure 32:
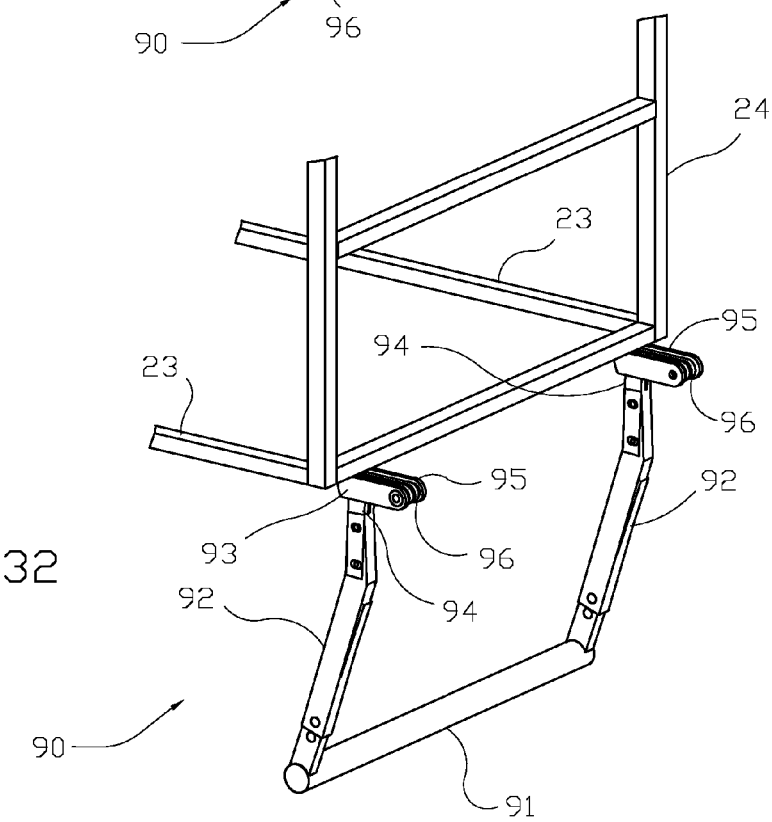

As best seen in FIGS. 31, 32, prop 90 comprises a U-shaped yoke almost as wide as basket 20 for maximum lateral stability. Horizontal bar 91 bears against bumper 13 and couples to base 23 through adjustable arms 92 and hinge 95. In use, prop 90 extends downward from base 23 and forward to vehicle 10. Elbow 94 bears against the bottom of base 23, preventing prop 90 from rotating further and collapsing under the weight of basket 20. Spring pins 97 mate with holes 98 to permit adjustment of the length of arms 92 to fit vehicle 10 and to hold basket 20 substantially level. Shopper 4 likely would use cart 18 in the same vehicle 10 each time, and could set the length of arms 92 once and perhaps never have to adjust them again. He could do so, however, should he change vehicles 10. Prop 90 rotates vertically upward (FIGS. 29-31) to a position juxtaposed rear panel 24 when not in use and is held in such position by spring clamps 96.

While the invention has been particularly shown and described with reference to preferred and alternate embodiments, it will be understood by those skilled in the art that various changes in form and detail may be made therein without departing from the spirit and scope of the invention. For example, the foregoing contemplates using containers 1 for purchased goods when, in fact, cart 20 could be re-loaded with individual units of goods, since cart 20 goes home with shopper 4 and can be wheeled right up to shopper 4's pantry or refrigerator and unloaded. Also, a top for basket 20 to cover cargo area 25 could be provided, in the form of a flexible, substantially waterproof web (not shown) such as canvas or plastic intended to cover and protect cargo 1 from inclement weather.

Further, one embodiment of the invention includes front maneuvering wheels 71 mounted on the front corners of floor panel 23 to be toed-in by operating lever 74 to rotate pulley 73, shorten cables 75, 76 and pivot bracket 77. Wheels 71 instead could be mounted on fixed axles (not shown) adjacent the longitudinal midpoint of side wall panels 21, 22, with or without including transverse maneuvering wheel 72. The load of basket 20 would balance substantially on wheels 71 so mounted, and basket 20 could be maneuvered by urging it to rotate horizontally, without the need for lever 74, pulley 73 and cables 75. Of course, they could be included on a bracket (not shown) that raises and lowers wheels 71 alongside side panels 21, 22 if retracting wheels 71 is desired.

We claim:

1. An improved shopping cart comprising
   a cargo basket having
      a floor panel having side edges disposed parallel to and on opposite sides of a longitudinal axis and extending between transverse front and rear edges;
      basket walls disposed atop said floor panel and extending upward therefrom to surround and define an interior cargo space;
      a transverse leg axle coupled to said floor panel adjacent said rear edge;
   two collapsible legs coupled to said leg axle and adapted to articulate between a folded position alongside said basket walls and an extended position disposed below said floor panel, wherein each of said collapsible legs further comprises
      a mast rotatably coupled to one end of said leg axle;
      a footer coupled to said mast at a mast end distal said leg axle;
      castors disposed on opposite ends of said footer; and
      releasable locking means disposed between said footer and said mast for locking said footer into a predetermined angle relative to said mast, wherein said releasable locking means comprises
         a latch coupled between said footer and said mast and surrounding and defining a notch;
         a latch lever bearing a latch pin and coupled by its proximate end to said latch and adapted to articulate between an unlocked position with its distal end disposed atop said footer and a locked position with its distal end a spaced distance above said footer and said latch pin engaging said notch; and
         a keeper disposed on an end of said latch lever distal said latch and adapted alternately to release said latch lever and to retain said latch lever in said locked position.

2. The improved shopping cart of claim 1 and further comprising
   a damper coupled between said footer and said mast and adapted to slow rotation of said footer relative to said mast when said latch pin disengages said notch.

3. An improved shopping cart comprising
   a cargo basket having
      a floor panel having side edges disposed parallel to and on opposite sides of a longitudinal axis and extending between transverse front and rear edges;
      basket walls disposed atop said floor panel and extending upward therefrom to surround and define an interior cargo space;
      a transverse leg axle coupled to said floor panel adjacent said rear edge;
   two collapsible legs coupled to said leg axle and adapted to articulate between a folded position alongside said basket walls and an extended position disposed below said floor panel, wherein each of said collapsible legs further comprises
      a mast rotatably coupled to one end of said leg axle;
      a footer coupled to said mast at a mast end distal said leg axle;
      castors disposed on opposite ends of said footer; and
      releasable locking means disposed between said footer and said mast for locking said footer into a predetermined angle relative to said mast;
   two coiled springs, one each surrounding and coupled to opposite ends of said leg axle and including a finger protruding tangent to said leg axle a spaced distance;
   two gussets coupled to said floor panel and extending longitudinally rearward from said rear edge to terminate adjacent an end of said leg axle, each of said gussets bearing a transverse detent; and
   a limit arm coupled to each said masts adjacent said gussets and adapted alternately to engage said detent when said collapsible leg is in said folded position and one of said fingers when said collapsible leg is in said extended position.

4. An improved shopping cart comprising
   a cargo basket having
      a floor panel having side edges disposed parallel to and on opposite sides of a longitudinal axis and extending between transverse front and rear edges;
      basket walls disposed atop said floor panel and extending upward therefrom to surround and define an interior cargo space;
      a transverse leg axle coupled to said floor panel adjacent said rear edge;
   two collapsible legs coupled to said leg axle and adapted to articulate between a folded position alongside said basket walls and an extended position disposed below said floor panel, wherein each of said collapsible legs further comprises
      a mast rotatably coupled to one end of said leg axle;
      a footer coupled to said mast at a mast end distal said leg axle;

castors disposed on opposite ends of said footer; and
releasable locking means disposed between said footer and said mast for locking said footer into a predetermined angle relative to said mast;
height adjustment means disposed within said masts for adjusting a height of said cargo basket relative to said footer, wherein said height adjustment means comprises
a mast extension coupled between said mast and said leg axle and telescopically cooperating with said mast;
a worm gear coupled between said mast extension and said mast;
a motor disposed on said mast and coupled to said worm gear, said motor adapted to turn said worm gear to retract and extend said mast extension telescopically into and out of said mast;
and
control means coupled to said motor for controlling and operating said motor.

5. The improved shopping cart of claim 4 wherein said control means comprises
a cowling surrounding and disposed above said leg axle;
at least one battery disposed on said cowling;
electric leads coupled between said at least one battery and said motor; and
a reversing switch disposed on said cowling and electrically connected within said electric leads between said motor and said at least one battery.

6. An improved shopping cart comprising
a cargo basket having
a floor panel having side edges disposed parallel to and on opposite sides of a longitudinal axis and extending between transverse front and rear edges;
basket walls disposed atop said floor panel and extending upward therefrom to surround and define an interior cargo space;
a transverse leg axle coupled to said floor panel adjacent said rear edge;
two collapsible legs coupled to said leg axle and adapted to articulate between a folded position alongside said basket walls and an extended position disposed below said floor panel;
a plurality of maneuvering wheels coupled to said floor panel and extending below said floor panel to support said cargo basket when said collapsible wheels are in said folded position;
a pivot bracket coupled between at least two of said plurality of maneuvering wheels and said floor panel, said pivot bracket adapted to articulate between a maneuvering position and a standby position;
a control lever coupled to said cargo basket and adapted to articulate between a first lever position corresponding to said maneuvering position and a second lever position corresponding to said standby position;
a cable coupled between said control lever and each of said pivot brackets; and
a return spring coupled to each of said pivot brackets and adapted to urge said pivot bracket into said standby position.

7. An improved shopping cart comprising
a cargo basket having
a floor panel having side edges disposed parallel to and on opposite sides of a longitudinal axis and extending between transverse front and rear edges;
basket walls disposed atop said floor panel and extending upward therefrom to surround and define an interior cargo space;
a transverse leg axle coupled to said floor panel adjacent said rear edge;
two collapsible legs coupled to said leg axle and adapted to articulate between a folded position alongside said basket walls and an extended position disposed below said floor panel;
prop means disposed on said floor panel adjacent said rear edge for propping said cargo basket against a portion of a vehicle, wherein said prop means comprises
a substantially rectangular yoke disposed parallel to said rear edge and hingedly coupled thereto on each end of said yoke by an elbow, said yoke and said elbow adapted to articulate between a retracted prop position adjacent said basket walls and an extended prop position;
adjustable arms coupled between said elbow and said yoke; and
spring clamps coupled to said elbow and adapted to hold said yoke in said retracted prop position.

8. An improved shopping cart comprising
a cargo basket having
a floor panel having side edges disposed parallel to and on opposite sides of a longitudinal axis and extending between transverse front and rear edges;
basket walls disposed atop said floor panel and extending upward therefrom to surround and define an interior cargo space;
a transverse leg axle coupled to said floor panel adjacent said rear edge;
maneuvering wheels coupled to said floor panel; and
an adjustable prop disposed on said floor panel adjacent said rear edge and adapted to articulate between a retracted position adjacent said basket walls and a propping position extending below said floor panel; and
two collapsible legs coupled to said leg axle and adapted to articulate between a folded position and an extended position, each of said collapsible legs having
a mast coupled by its proximate end to one end of said leg axle and having
a mast extension coupled between said mast and said leg axle;
a motor coupled between said mast extension said mast, said motor adapted to retract and extend said mast extension telescopically into and out of said mast; and
a footer coupled to a mast end distal said leg axle, said footer having
castors disposed on opposite ends of said footer;
a latch disposed between said footer and said mast, said latch having;
a latch lever coupled to said latch and adapted to release said latch; and
a keeper disposed on an end of said latch lever distal said latch and adapted alternately to release said latch lever and to retain said latch lever in a locked position.

9. An improved method of transporting a collection of small objects from a first storage site having a plurality of small object storage locations to a second storage site, the improved method comprising
providing a shopping cart having
cargo basket having
a floor panel having longitudinal side edges extending between transverse front and rear edges;
basket walls extending upward from said floor panel to surround and define an interior cargo space; and a transverse leg axle coupled to said floor panel adjacent said rear edge;

two collapsible legs coupled to said cargo basket and adapted to articulate between a folded position and an extended position, each of said collapsible legs having a mast coupled by a proximate mast end to said floor panel, said mast further having a mast extension coupled between said mast and said floor panel; and a motor coupled to said mast extension and adapted to retract and extend said mast extension telescopically into and out of said mast; and a footer coupled to a mast end distal said floor panel;

providing a vehicle having a cargo compartment having a cargo compartment floor and a cargo compartment opening; then selecting said collection of small objects from said plurality of small object storage locations and placing said small objects into said interior cargo space; then positioning said shopping cart at said vehicle adjacent said cargo compartment; then urging said cargo basket through said cargo compartment opening at least partially into said cargo compartment and supported by said cargo compartment floor with said masts abutting said cargo compartment opening; then collapsing said collapsible legs into said folded position; then moving said cargo basket fully into said cargo compartment; then transporting said vehicle to a parking location adjacent said second storage site; then extracting said cargo basket through said cargo compartment opening until said collapsible legs can be extended; then articulating said collapsible legs into said extended position; then wheeling said shopping cart from said vehicle to said second storage site; then unloading said small objects from said cargo basket into said second storage site.

10. The improved method of claim 9 and further comprising the steps of providing a plurality of maneuvering wheels pivotally coupled to said floor panel;

providing an adjustment lever disposed on said cargo basket edge and coupled to at least two of said plurality maneuvering wheels; then, as part of said urging step, assuring that at least two of said maneuvering wheels rest upon said cargo space floor; and then, as part of said moving step, rotating said adjustment lever to reposition said at least two maneuvering wheels into a maneuvering position; then pushing said cargo basket transversely to roll said cargo basket upon said maneuvering wheels until said cargo basket rotates to fit within said cargo compartment.

\* \* \* \* \*